United States Patent [19]

Omi

[11] Patent Number: 5,074,179
[45] Date of Patent: Dec. 24, 1991

[54] VIBRATION DAMPER FOR ROTARY CUTTER

[75] Inventor: Shohei Omi, Anjo, Japan

[73] Assignee: Omi Kogyo Co., Ltd., Anjo, Japan

[21] Appl. No.: 602,673

[22] Filed: Oct. 24, 1990

[30] Foreign Application Priority Data

Mar. 2, 1990 [JP] Japan .............................. 2-21695[U]

[51] Int. Cl.[5] ................................................ B27B 5/38
[52] U.S. Cl. ......................................... 83/478; 83/666; 83/676; 83/821; 83/823
[58] Field of Search ................. 83/478, 823, 821, 701, 83/666, 827, 824, 825, 62.1, 397; 188/73.1, 250 B

[56] References Cited

U.S. PATENT DOCUMENTS

| 2,709,464 | 8/1951 | Kreidler | 83/478 |
| 2,984,268 | 5/1961 | Vuichard | 83/478 X |
| 3,772,956 | 11/1973 | McMillan | 83/821 X |
| 4,854,207 | 8/1989 | Kirbach et al. | 83/823 |

FOREIGN PATENT DOCUMENTS 2-31620 2/1990 Japan .

Primary Examiner—Douglas D. Watts
Assistant Examiner—C. Dexter
Attorney, Agent, or Firm—Oblon, Spivak, McClelland, Maier & Neustadt

[57] ABSTRACT

A vibration damper for a rotary cutter is disclosed. The rotary cutter has a rotary saw blade and a guard for covering the rotary saw blade. The vibration damper is disposed inside the guard and has a contact member which contacts the rotary saw blade.

13 Claims, 4 Drawing Sheets

VIBRATION DAMPER FOR ROTARY CUTTER

This application claims the priority of Japanese Utility Model Application No. 2-21695 filed on Mar. 2, 1990 which is incorporated herein by reference.

BACKGROUND OF THE INVENTION

1. Field of the Invention

The present invention relates to a rotary cutter having a saw blade. More particularly, the present invention relates to a device for reducing vibrations of the saw blade during its rotation.

2. Description of the Related Art

Rotary cutters having saw blades such as circular saws, rotary chip saws, rotary diamond-blade saws or the like are generally known. In such rotary cutters, rotations of the saw blade cause vibrations of the blade body which in turn create noise.

The vibrations of the blade body during rotation can also cause accidental chips and/or burrs on the cut surface of a work, resulting in a poorly finished cut surface. Extended use of saw blades subject to vibration deteriorates the cutting edges at the periphery of the saw blades thereby reducing their product life. In addition, in order to improve working conditions, it is desirable to minimize vibration as well.

In order to solve the foregoing problems, the present inventor proposed a rotary cutter vibration damper in Japanese Laid-Open Utility Model Publication No. 2-31620. That vibration damper is shown generally in FIG. 5. As shown in FIG. 5, a rotary cutter 21 has a rotary saw blade 23 which is covered with a safety guard 25. The guard 25 has a vibration damper 22 composed of an idler roller 27, a bracket 24, a shaft 26 and a coil spring 28. The vibration damper 22 is attached to the guard 25 by way of an attachment cover 29.

The shaft 26 penetrates both guard 25 and attachment 29 which support the shaft 26 such that the shaft 26 is movable back and forth. The bracket 24 is fixed to the tip of the shaft 26. The bracket 24 supports the idler roller 27, which is in contact with the rotary saw blade 23 and rotates in accordance with the rotation of the saw blade 23. The coil spring 29 urges the shaft 26 in the direction that the idler roller 27 presses against the saw blade 23.

The idler roller 27 keeps in contact with the rotary saw blade 23 when the saw blade 23 is rotating, so that vibrations of the saw blade 23 are transmitted to the guard 25 by way of the vibration damper 22. This vibration energy is absorbed by the rotary cutter 21, and thus the vibration of the rotary saw blade 23 is reduced.

SUMMARY OF THE INVENTION

Accordingly, a primary object of the present invention is to provide a vibration damper for a rotary cutter which can reduce vibrations and noises of the saw blade during a cutting procedure simply and effectively, and which can be disposed at the rotary cutter without projecting from the blade guard.

To achieve the foregoing and other objects and in accordance with the purpose of the present invention, an improved vibration damper for a rotary cutter is proposed. The rotary cutter has a rotary saw blade and a guard which covers the rotary saw blade. The whole body of the vibration damper is housed inside the blade guard. The vibration damper is considerably small and has a contact member for contacting the rotary saw blade.

In a preferred embodiment, the vibration damper has a spring or the like for urging the contact member to press against the rotary saw blade. This even more effectively reduces the vibration of the rotary saw blade.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENTS

Figure 1:
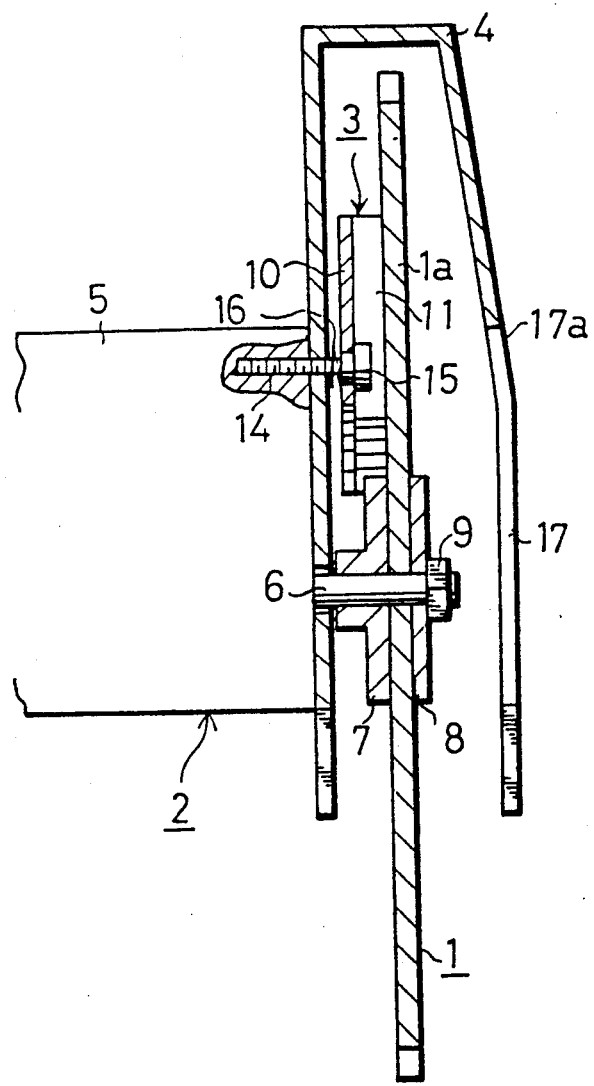
FIG. 1 is a sectional view showing the portion of a rotary cutter having a vibration damper of a first embodiment of the present invention attached thereto.

As illustrated in the drawings, a preferred first embodiment of the present invention will be described in detail hereinafter.

Figure 2:
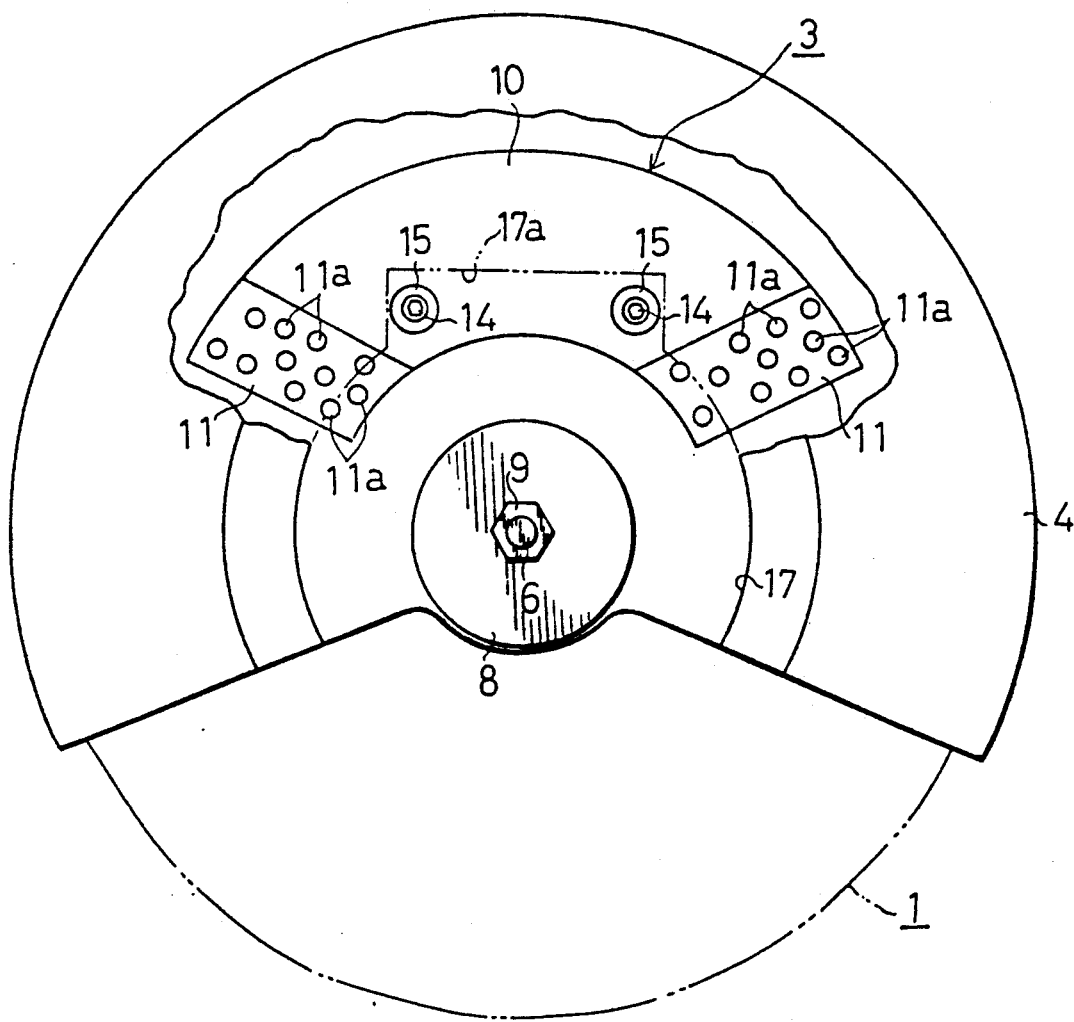
FIG. 2 is a partially broken-away side view of the vibration damper for the rotary cutter shown in FIG. 1.

As shown in FIGS. 1 and 2, a rotary cutter 2 has a blade guard 4 for covering a rotary saw blade 1. The guard 4 is fixed to an end portion of a body 5 of the rotary cutter 2 (only a part of which is shown) by means of not shown bolts.

The cutter body 5 includes an electric motor which has a drive shaft 6 projecting from an inside of the cutter body 5 toward an inside surface of the guard 4. An external thread is formed at a tip of the drive shaft 6. The drive shaft 6 also has a flange 7 fixed thereto and an attachment plate 8 disposed thereon. The rotary saw blade 1 such as a circular saw or the like is exchangeably supported by the drive shaft 6 between the flange 7 and the attachment plate 8 by tightening a nut 9 disposed at an outside of the attachment plate 8.

The vibration damper 3 is provided inside the guard 4 and located between the internal surface of the guard 4 and a body 1a of the rotary saw blade 1. The vibration damper 3 has an arcuate metal plate 10 and a pair of contact members 11 each fixed to one side surface of and at each end of the plate 10. Each contact member 11 is made of a wood segment and has a plurality of dimples 11a formed on its surface for absorbing noises.

Figure 3:
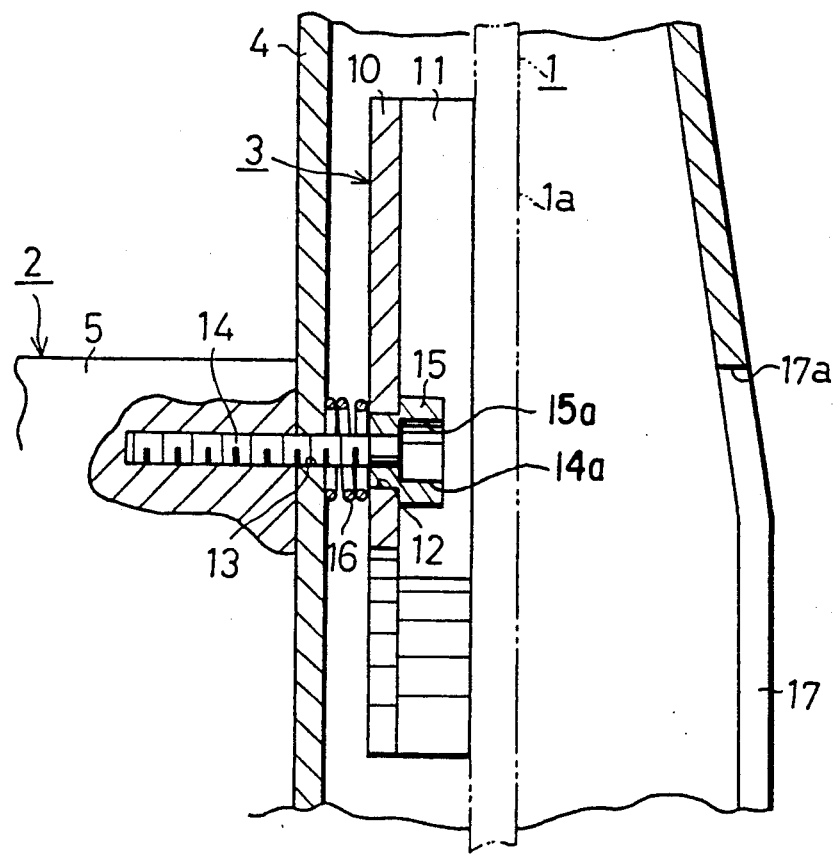
FIG. 3 is an enlarged sectional view of the vibration damper for the rotary cutter shown in FIG. 1.

As shown in FIG. 3, a pair of holes 12 (only one is shown) are formed on the plate 10. The guard 4 also has a pair of holes 13 (only one is shown) corresponding to the holes 12. The plate 10 is fixed to the cutter body 5 by means of a pair of hexagon headed bolts 14 which are inserted through the holes 12 and 13. Each bolt 14 has a bolt head 14a.

As shown in FIGS. 2 and 3, a pair of sleeve washers 15 are inserted in the holes 12, and each sleeve washer 15 has a stepped recess 15a. Each bolt head 14a is engaged with a stepped portion of each recess 15a, and a large diameter portion of each sleeve washer 15 is engaged with a surface of each plate 10, so that the plates 10 are prevented from falling off from the bolts 14.

Between the inner surface of the guard 4 and the plate 10, each hexagon headed bolt 14 has a coil spring 16 into which each bolt 14 is inserted. The coil springs 16 urge the plates 10 outwardly to press the surfaces of the contact members 11 against the blade body 1a.

As shown in FIG. 2, the guard 4 has an opening 17 (a part of which is shown as a two-dot chain line) of a substantially half circle shape having the drive shaft 6 as its center. The opening 17 is formed on one side surface of the guard 4. A rectangular shape upper portion 17a (shown as a two-dot chain line) of the opening 17 is defined so as to correspond to the holes 13 and the bolts 14. Accordingly, an operator can easily assemble the bolts 14 and the like.

The vibration damper 3 is attached to the cutter body 5 before the rotary saw blade 1 is assembled. The sleeve washers 15 and the bolts 14 are first inserted into the holes 12 on the plates 10, then the coil springs 16 are attached to the bolts 14. The tips of the bolts 14 are inserted into the holes 13 on the guard 4, and the bolts 14 are tightened and fixed to the cutter body 5. As a result, the coil springs 16 are compressed and urge the plates 10 outwardly.

After the vibration damper 3 is assembled, the rotary saw blade 1 is fixed to the drive shaft 6 in a conventional order. At this time, the attachment of the saw blade 1 is performed against the urging force of the coil springs 16. Therefore, when the saw blade 1 has been attached to the drive shaft 6, both the contact members 11 are pressed against the blade body 1a.

Then, when the electric motor is driven, the rotary saw blade 1 rotates having the contact members 11 sliding on the blade body 1a. Thus, the vibrations of the saw blade 1 can be reduced by the contact members 11, the plates 10 and the coil springs 16.

Therefore, the rotation of the saw blade 1 is stabilized and the cut surface of the work can be finished in a better condition. In addition, the cutting edges will wear slower giving the saw blade a longer product life.

Noise reductions accompany the reduction of the vibrations thus providing better working conditions. Particularly in this embodiment, the dimples 11a formed on the contact members 11 absorb the kind of the vibration which especially causes the noise, thus effectively preventing the noise.

Also in this embodiment, the plates 10 and the coil springs 16 can be attached to the cutter body 5 by means of the hexagon headed bolts 14. Therefore, the rotary saw blade 1 itself does not need any special modification or process. Accordingly, the vibration damper 3 of the present embodiment can be easily attached to conventional rotary cutters.

In this embodiment, all the members 10, 11 and 14 to 16 composing the vibration damper 3 are placed inside the guard 4, and none of the vibration damper 3 is located outside the guard 4. Thus, the rotary cutter 2 having the present embodiment vibration damper 3 has a better appearance than rotary cutters having a prior art vibration damper 22. In addition, the rotary cutter 2 of the present embodiment has no projection thereon, so that the cutting procedure will never be disturbed by such a projection.

Figure 4:
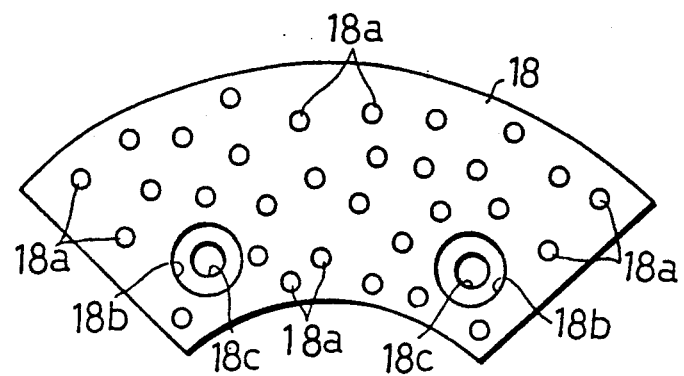
FIG. 4 is a view showing a modification of a contact member.
Figure 5:
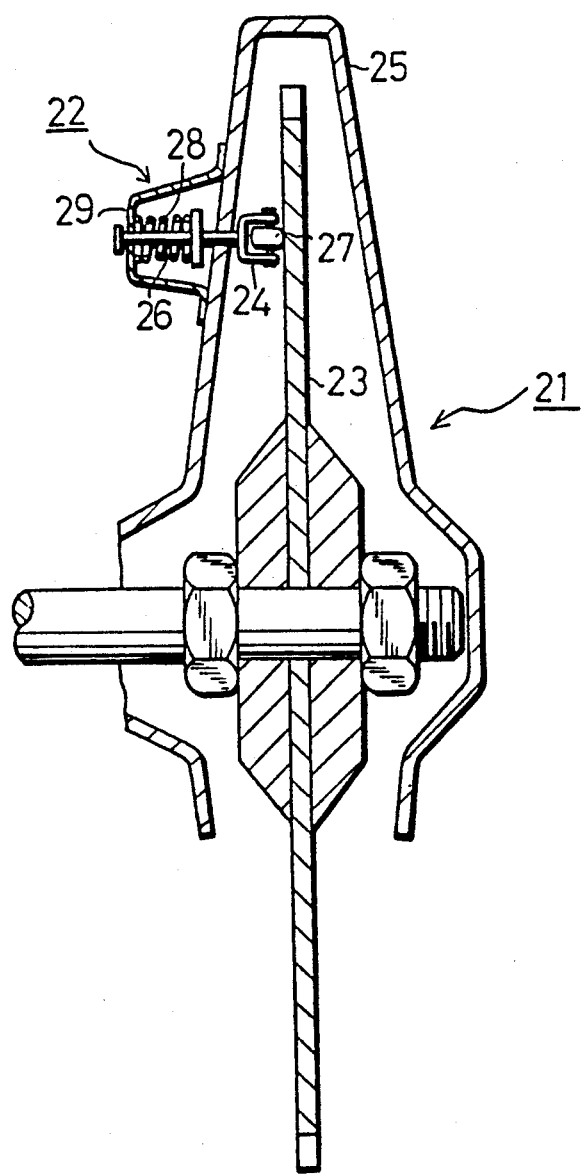
FIG. 5 is a sectional view of an important portion of a prior art vibration damper for a rotary cutter.

As shown in FIG. 4, the contact members can take the form of a single contact member 18. In this case, a plurality of dimples 18a for absorbing noises and a pair of enlarged recesses 18b for housing bolt head 14a are formed on a surface of the contact member 18. Holes 18c for inserting the bolts 14 are formed in the recesses 18b respectively. In addition, the shape of the contact member is not limited to the arcuate geometries described, and may take any form.

Although only a couple embodiments of the present invention have been described herein, it should be apparent to those skilled in the art that the present invention may be embodied in many other specific forms without departing from the spirit or scope of the invention. Particularly, it should be understood that following modes are contemplated as well.

For example, the dimples 11a on the contact members 11 need not always be formed.

The contact members 11 can be made from a wide variety of materials that are softer than the rotary saw blade 1, such as synthetic resin, rubber and so on.

The contact members 11 can be attached to the inner surface of the cover 4 directly without having coil springs 16 or the like therebetween.

The vibration damper 3 can be positioned on the opposite side of the rotary saw blade 1, that is, being away from the cutter body 5. The vibration damper 3 can further be placed at any position inside the guard 4 so long as the contact members 11 can contact the saw blade 1.

Therefore, the present examples and embodiments are to be considered as illustrative and not restrictive, and the invention is not to be limited to the details giving herein, but may be modified within the scope of the appended claims.

What is claimed is:

1. A rotary cutter comprising:
   a saw blade;
   a cutter body supporting said saw blade;
   a blade guard covering the saw blade; and
   a vibration damper for reducing vibrations of the saw blade, said vibration damper being contactable with the saw blade, said vibration damper being disposed entirely within said blade guard, and said vibration damper being secured to the cutter body from a position within the blade guard.

2. A rotary cutter as set forth in claim 1 wherein said vibration damper has a contact member directly contacting the saw blade, and said contact member is made of material softer than the saw blade.

3. A rotary cutter as set forth in claim 2 wherein said contact member is made of wood.

4. A rotary cutter as set forth in claim 2 wherein said contact member has at least one dimple formed on a surface thereof for reducing vibrational noises.

5. A rotary cutter as set forth in claim 1, wherein said blade guard is fixed to an end portion of the cutter body and wherein said blade guard is substantially U-shaped in cross-section, said blade guard having opposite side walls spaced to accommodate the saw blade and said vibration damper.

6. A vibration damper for a rotary cutter having a saw blade supported by a cutter body and a blade guard covering the saw blade, the vibration damper comprising:
   a contact member being contactable with the saw blade; and
   urging means for pressing the contact member against the saw blade, said contact member and said urging means being disposed entirely within said blade guard, and said vibration damper being secured to said cutter body from a position within the blade guard.

7. A vibration damper for a rotary cutter as set forth in claim 6 wherein said contact member is made of material softer than the saw blade.

8. A vibration damper for a rotary cutter as set forth in claim 7 wherein said contact member is made of wood.

9. A vibration damper for a rotary cutter as set forth in claim 7 wherein said contact member has at least one dimple formed on a surface thereof for reducing vibrational noises.

10. A rotary cutter as set forth in claim 6, wherein said blade guard is fixed to an end portion of the cutter body and wherein said blade guard is substantially U-shaped in cross-section, said blade guard having opposite side walls spaced to accommodate the saw blade and said vibration damper.

11. A vibration damper for a rotary cutter which has a saw blade and a blade guard covering the saw blade, the vibration damper comprising:

a plurality of supporting shafts disposed inside the guard and projecting toward the saw blade;

a contact member supported by and being movable along the supporting shafts, said contact member directly contacting the saw blade and being made of material softer than the saw blade;

springs wound about the supporting shafts respectively for urging the contact member so as to press the contact member against the saw blade;

wherein said vibration damper is disposed entirely within said blade guard, and wherein said blade guard has a cutout on one side thereof which exposes the supporting shaft to facilitate assembly of the vibration damper.

12. A rotary cutter comprising:

a saw blade;

a cutter body supporting said saw blade;

a blade guard covering the saw blade; and a vibration damper for reducing vibrators of the saw blade, said vibration damper including a contact member adapted to contact the saw blade, and said contact member having at least one dimple formed on a surface thereof for reducing vibrational noises.

13. A rotary cutter according to claim 12, wherein said contact member includes a plurality of dimples formed on a surface thereof.

* * * * *